USOO6298959B1

(12) United States Patent
Willner et al.

(10) Patent No.: US 6,298,959 B1
(45) Date of Patent: Oct. 9, 2001

(54) MOTION-DAMPING ARRANGEMENT, IN PARTICULAR FOR MOTOR VEHICLES

(75) Inventors: Wilfried Willner, Augsburg; Hans Possler, Wettstetten; Christof Oles, Lenting, all of (DE)

(73) Assignee: Hoerauf & Kohler Verwaltungs KG, Augsburg (DE)

( * ) Notice: Subject to any disclaimer, the term of this patent is extended or adjusted under 35 U.S.C. 154(b) by 0 days.

(21) Appl. No.: 09/595,753

(22) Filed: Jun. 16, 2000

(30) Foreign Application Priority Data

Jun. 19, 1999 (DE) .............................. 199 28 194

(51) Int. Cl.[7] ............................................ F16F 9/50
(52) U.S. Cl. ...................... 188/281; 188/1.11 E; 188/290
(58) Field of Search ........................... 188/1.11 E, 266.3, 188/281, 290, 296, 300; 267/64.12; 340/540, 635, 644, 665, 686, 425, 438, 440; 296/56, 57.1; 16/49

(56) References Cited

U.S. PATENT DOCUMENTS

| 3,573,725 | * | 4/1971 | Shellhause | ..................... 340/60 |
| 4,470,625 | * | 9/1984 | Walsh et al. | ..................... 292/201 |
| 4,540,208 | * | 9/1985 | Logan, Jr. et al. | ............. 292/341.19 |
| 4,932,247 | * | 6/1990 | Gorres | ..................... 73/129 |
| 5,064,033 | * | 11/1991 | Koike et al. | ..................... 188/306 |
| 5,592,780 | * | 1/1997 | Checkovich | ..................... 49/386 |
| 5,862,896 | * | 1/1999 | Villbrandt et al. | . |

FOREIGN PATENT DOCUMENTS

| 296 00 438 U1 | 5/1996 | (DE) . |
| 196 42 806 | 1/1998 | (DE) . |
| 413 308 A2 | 2/1991 | (EP) . |

* cited by examiner

*Primary Examiner*—Robert J. Oberleitner
*Assistant Examiner*—Xuan Lan Nguyen
(74) *Attorney, Agent, or Firm*—Flynn, Thiel Boutell & Tanis, P.C.

(57) ABSTRACT

A motion-restraining arrangement is described, which has a motion restrainer, which has a housing that is essentially stationary. It includes a restraining device, and a connecting member movable relative to the housing. The housing can be connected to a movable part to be restrained in its movement. Furthermore a switch having two contacts is connected to the housing. The operating member for the switch is provided on the connecting member. The switch may be operated by the operating member pressing contacts against one another.

13 Claims, 4 Drawing Sheets

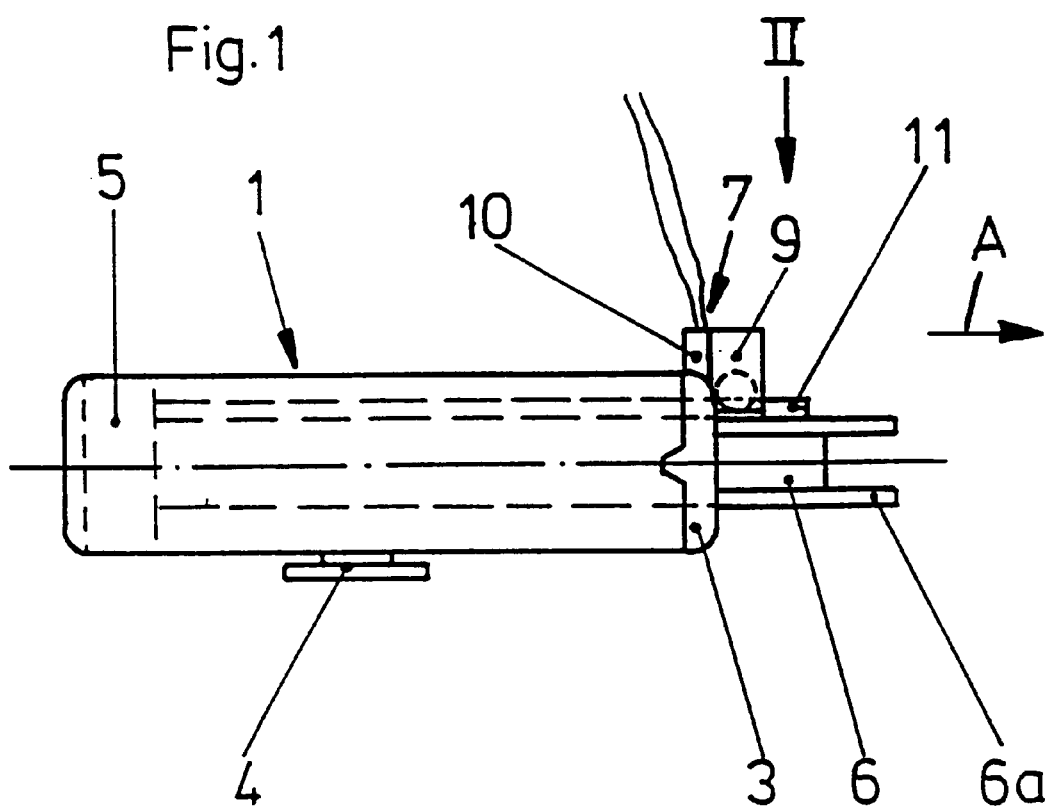

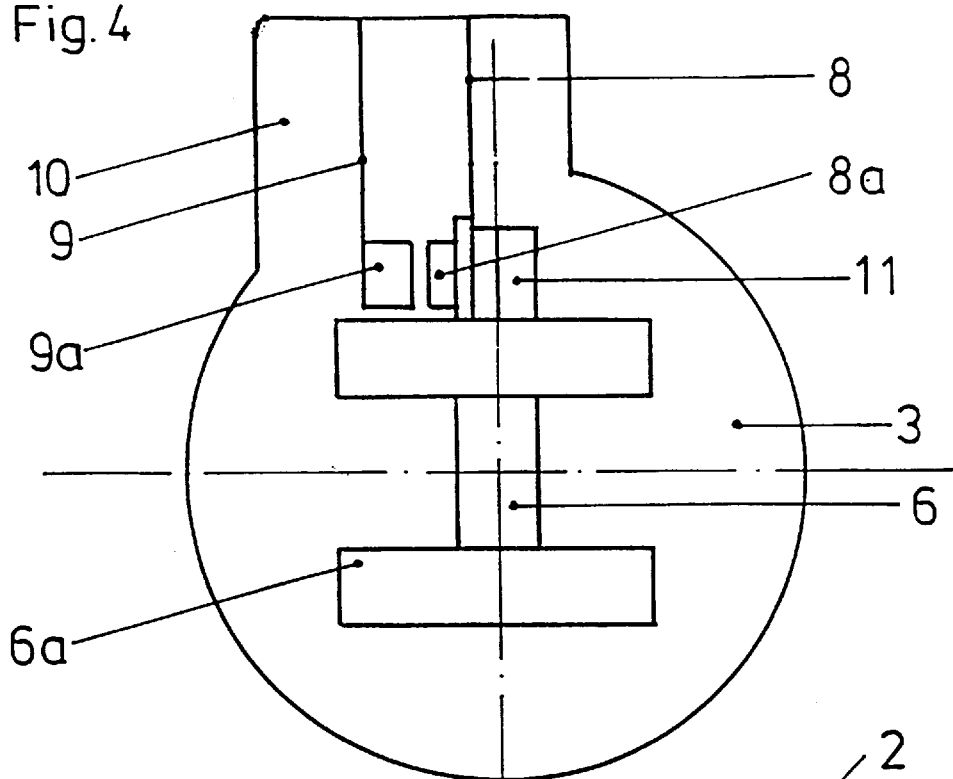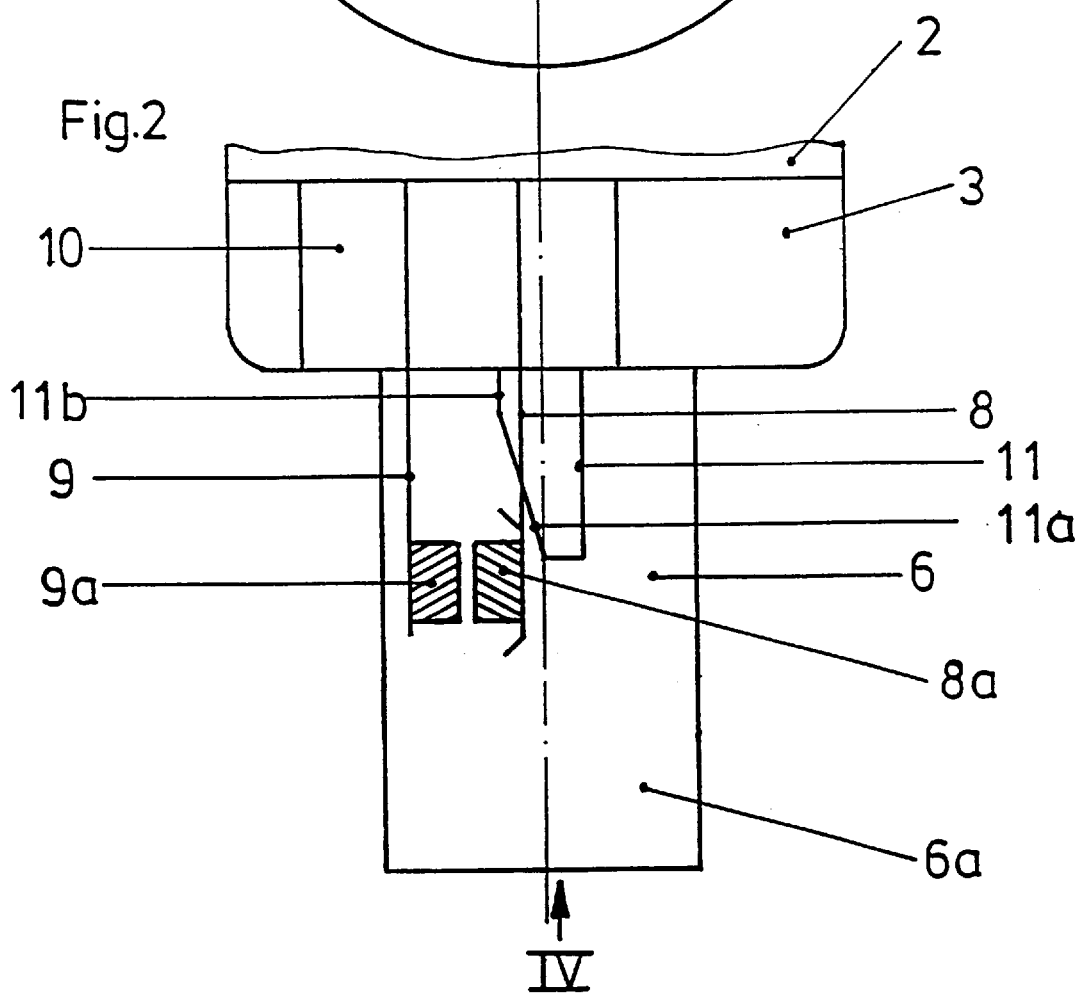

MOTION-DAMPING ARRANGEMENT, IN PARTICULAR FOR MOTOR VEHICLES

FIELD OF THE INVENTION

The invention relates to a motion-damping arrangement, in particular for motor vehicles, comprising a motion restrainer, which has a housing. The housing is built in essentially a stationary manner and includes a restraining device. It also has a connecting member movable relative to the housing, which may be connected to a movable part, in particular a door which is to be restrained. It also has a switch to turn a light on and off, the operating member of which may be operated by the movable part.

BACKGROUND OF THE INVENTION

Motion dampers are often used in the car industry in order to slow down the movement of an openable door, such as the door of a glove compartment. Such doors are often rather heavy and are designed such that a portion of the content of the glove compartment rests on them. When the lock of the door is released, the door swings downwardly into the open position under force. So that the door will not abruptly drop down and fall on the legs of the passenger, a hydraulic or pneumatic motion damper (DE 296 00 438 U1) is provided. The restrainer may consist of a cylinder closed at one side with a piston movable therein and a piston rod connected to the piston. The cylinder is pivotally mounted on a part of the motor vehicle, whereas the free end of the piston rod is connected to the door.

In order for the glove compartment to be illuminated during opening of the door, an interior light is mounted in it. A switch is connected to the motor vehicle in the one side of the door which has contact tongues that are pressed onto one another by two springs. A plastic operating member is either directly molded to the door or manufactured separately and connected to the door. When the door is closed, the operating member engages the contact tongues of the switch, interrupting the current supply to the interior light. Upon opening the door, the operating member is pulled out from between the contacts so that they will rest against one another, activating the interior light. Mounting the switch on the vehicle requires significant installation expense. When the operating member is directly molded to the door, a more complicated and more expensive injection mold is required. When separately manufactured, a separate injection mold is required. Furthermore the separately manufactured operating member must in addition be mounted on the door.

It has also been found that at high temperatures, such as those reached inside a vehicle in the summer, the door expands significantly, which causes the operating member to shift transversely with respect to the contact tongues. This can result in the operating member malfunctioning and damaging the contacts.

The European Patent Application EP 0 413 308 A2 discloses a motion restrainer having an integrated light source and a switch. The switch is formed out of two contact tongues, which, when the door is opened, are biased against one another, closing the circuit to the current supply of the light source. When closing the door, an operating member arranged on the cylinder housing of the motion restrainer engages between the contacts, thus breaking the circuit and turning off the light.

A disadvantage of a motion damper with this type of switch is that the initial tension of the contacts is not sufficient to press these contacts firmly against one another when strong vibrations or temperature changes occur. Thus, it is possible for contact breakdowns to occur in the case of strong motor vibrations.

Therefore the basic purpose of the invention is to provide a motion-damping arrangement, in particular for motor vehicles, of the abovementioned type, which is cheaper to manufacture and install, and operates safely.

Compared with the motion restrainer of the state of the art, the present invention has the advantage that the contact, when the door is open, is automatically closed by the operating member. This feature avoids contact breakdowns due to vibration and heat expansion. Furthermore the contacts are pressed against one another over the entire length of thrust of the motion damper so that for every open position of the door a safe contact is guaranteed.

BRIEF DESCRIPTION OF THE DRAWINGS

The invention will be described in greater detail hereinafter in connection with exemplary embodiments illustrated in the drawings, in which:

FIG. 1 is a side view of the motion-damping arrangement in a first embodiment,

FIG. 2 is a partial top view in direction II of FIG. 1 of the open position of the switch, FIG. 4 is a front view in direction IV of FIG. 2.

DETAILED DESCRIPTION

Figure 3:
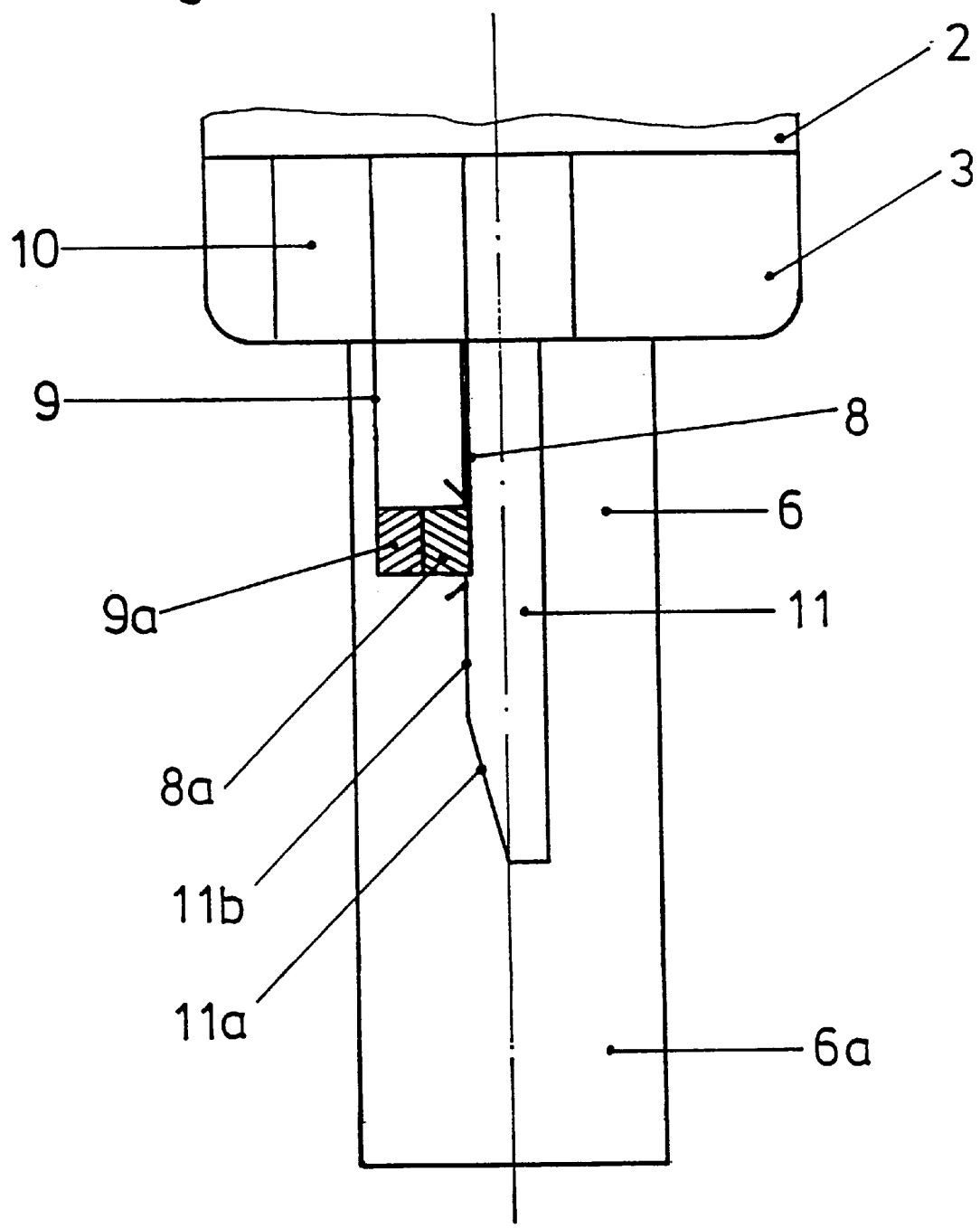
FIG. 3 is a similar partial top view in the closed position of the switch.

The motion damper 1 is, in the exemplary embodiment illustrated in FIGS. 1 to 4, designed as a pneumatic motion damper, as it is described, for example, in the DE 196 42 806 C 1. This motion damper 1 has a cylindrical housing 2 with a lid 3, which housing is closed at one end. The housing 2 has a shoulder 4, which is used to connect the housing 2 to a stationary part of the vehicle. A piston 5 with a piston rod 6 is movably supported in the housing 2. The piston rod 6 is guided outwardly through a suitable opening in the lid 3. A pneumatic or hydraulic cylinder may constitute the housing 2 that is attached to the lid. The free end 6a of the piston rod 6 is used for the hinged connection to a movable part of the vehicle, such as the door of a glove compartment (not shown). The piston rod 6 thus forms a movable connecting member between the motion restrainer 1 and the door. The piston 5 has a special motion-restraining device described in greater detail in the DE 196 42 806 C 1, which is designed in such a manner that when the piston rod 6 is pulled out of the housing 2 in direction A according to FIG. 1, a motion restraining occurs. Whereas when the piston rod 6 is moved in reversed direction into the housing 2, then an unhindered movement of same is possible. The motion-damping arrangement 1 includes a switch 7, which is provided to switch a light in the glove compartment on and off. This switch 7 has a movable, resilient contact tongue 8 (FIGS. 2–4) with the contact 8a and a stationary contact tongue 9 with the contact 9a. The contact tongues 8, 9 are held in a contact carrier 10, which is connected to the lid 3 of the housing.

The lid 3 and the contact carrier 10 are advantageously formed as a unitary, plastic part. The lid 3 meets in this manner its function as the lid of the cylindrical housing 2, in which it closes off the housing 2 and forms a guide for the piston rod 6, and serves at the same time as the contact carrier 10. This configuration reduces manufacturing and installation expenses.

A control rail 11, which cooperates with the movable contact tongue 8 of the switch 7, is provided on the piston rod 6, which is movable in its longitudinal direction in the housing 2. The control rail 11 extends thereby advantageously in longitudinal direction of the piston rod 6 and is advantageously designed in one single plastic injection part with the piston rod 6. The control rail 11 has a slope 11a at its outer end, which slope is followed by a support surface 11b, which extends in longitudinal direction of the control rail 11.

The control rail 11 is arranged and formed in this manner such that according to FIGS. 1 and 2, with the piston rod 6 having been moved into the housing 2, the control rail 11 is arranged spaced from the movable contact tongue 8. The contacts 8a, 9a are in this position open and the current to the interior light of the glove compartment is interrupted. Upon opening of the door, the piston rod 6 is pulled in direction A out of the housing 2. The slope 11a comes first into contact with the contact tongue 8 and presses the contact 8a against the fixed contact 9a. The interior light of the glove compartment is thus switched on. Since the support surface 11b extends over the entire extendable length of the piston rod 6, the two contacts 8a, 9a remain pressed against one another as long as the piston rod is pulled completely or partially out of the housing 2. Through the pressure of the support surface 11b on the movable contact tongue 8, the contacts 8a, 9a are pressed fixedly against one another from the outside so that the light cannot flicker.

Figure 5:
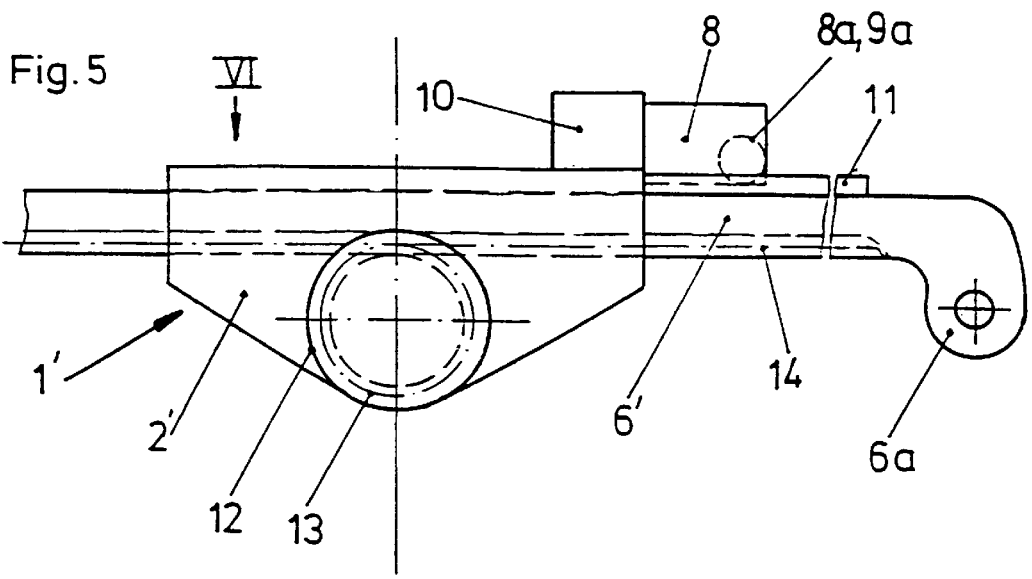
FIG. 5 is a side view of a second exemplary embodiment.
Figure 6:
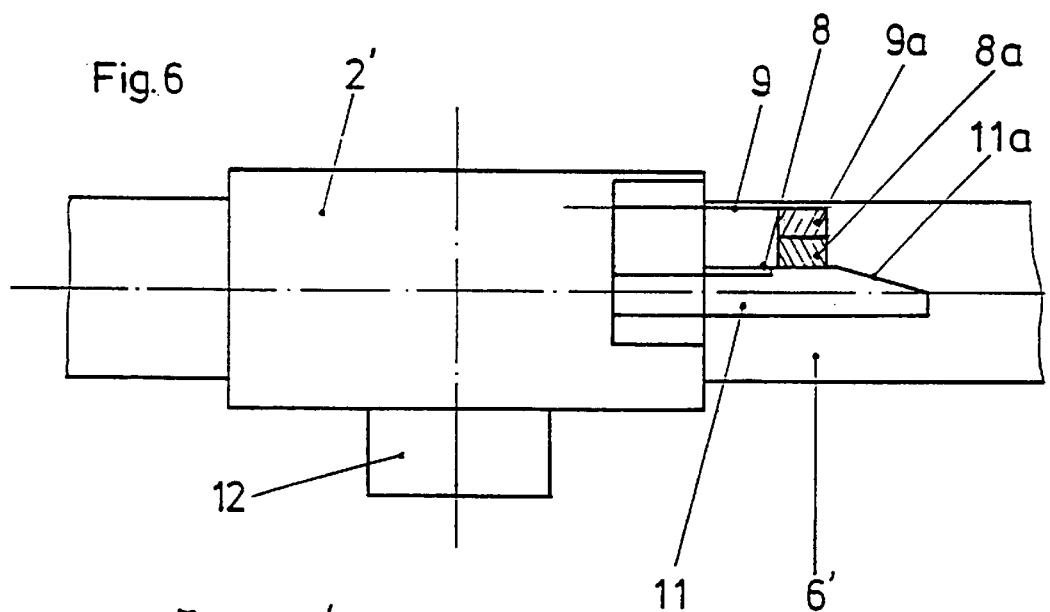
FIG. 6 is a top view in direction VI of FIG. 5 in the closed position of the switch.
Figure 7:
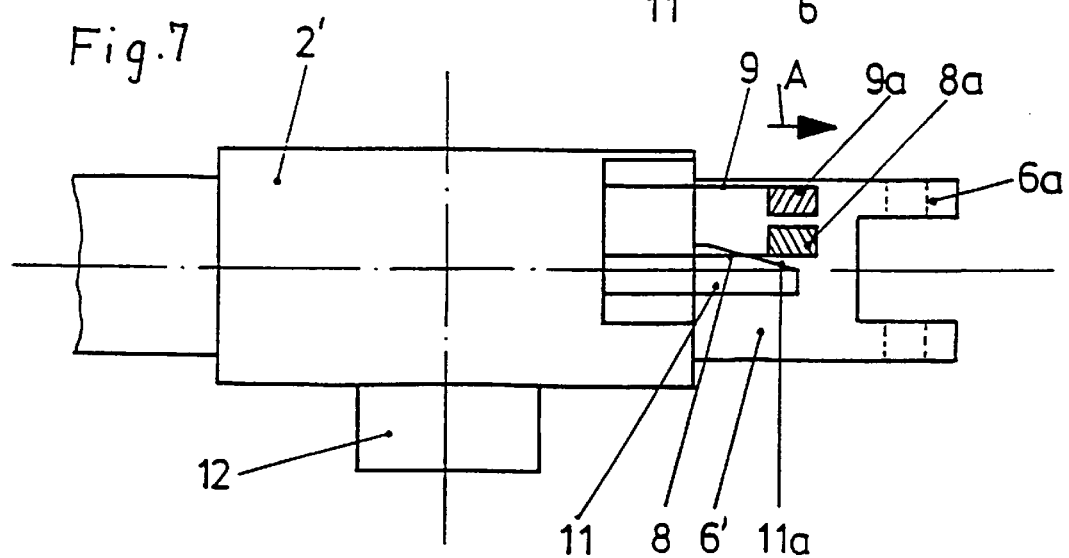
FIG. 7 is a similar top view in the open position of the switch.

A damping device in the form of a so-called rotary restrainer 12 is built into the housing 2' of the motion restrainer 1' in the exemplary embodiment illustrated in FIGS. 5 to 7. Such a rotary restrainer has an impeller (not shown), which can rotate in a viscous fluid and therefore applies a brake torque. The axis of this impeller is connected to a pinion 13. A rod 6' is furthermore movable in the housing 2'. This rod 6' has a rack 14 at its one side, which rack mates with a pinion 13.

A control rail 11 is in turn connected to the rod 6', which control rail consists advantageously of one part with the rod 6'. A switch 7 with a contact carrier 10 is arranged on the housing 2'. The contact carrier carries the movable contact tongue 8 and the fixed contact tongue 9. With regard to the design and the operation of control rail 11 and switch 7, the discussions relating to the exemplary embodiment according to FIGS. 1 to 4 apply in essentially the same manner. For this reason the same reference numerals were used. When the rod 6' according to FIG. 7 is pulled in direction A out of the housing 2', then this occurs against the braking force of the rotary restrainer 12, which is hereby rotated by the rack 14 through the pinion 13. When pulling the rod 6' out in direction A, the contacts 8a, 9a are closed in the manner described above and are held in the closed position until, after the rod 6' has been moved back into the housing 2', the position illustrated in FIG. 7 has again been reached.

The invention is not limited to the preceding exemplary embodiments. In place of a switch, it is also possible to provide a dimmer, which is operated by the operating member provided on the connecting member. If a dimmer is used, the interior light lights up slowly as the glove compartment door is opened.

What is claimed is:

1. A motion-restraining arrangement in motor vehicle comprising a housing and a connecting member, said connecting member being movable into and out of said housing and is connectable to a movable part, said connecting member being restrainable in its movement, a switch having two contacts and being arranged on said housing, an operating member arranged on said connecting member and being operatively connected to said switch, said switch being operable by said operating member, said operating member effecting a pressing of said contacts against one another.

2. The arrangement according to claim 1, wherein the connecting member is a rod, which can be moved in its longitudinal direction in the housing, and on which said operating member in the form of a control rail is provided, one of the two contacts being a movable contact, the control rail cooperating with the movable contact of the switch.

3. The arrangement according to claim 2, wherein the control rail extends in a longitudinal direction of the rod.

4. The arrangement according to claim 3, wherein the control rail is designed in one piece with the rod.

5. The arrangement according to claim 4, wherein the rod and the control rail are made as one single plastic injection part.

6. The arrangement according to claim 2, wherein the rod is movable into the housing and the control rail is formed and arranged in such a manner that the contacts of the switch are open when the rod has been moved in.

7. The arrangement according to claim 2, wherein the rod is designed as a piston rod.

8. The arrangement according to claim 1 further including a contact carrier and the contacts of the switch being connected to the contact carrier, a plurality of resilient contact tongues connecting the switch to the contact carrier, which the contact carrier in turn is connected to the housing.

9. The arrangement according to claim 8, wherein the contact carrier is formed by a part of the housing.

10. The arrangement according to claim 8, wherein the housing includes a pneumatic cylinder with a lid, through which the rod designed as a piston rod is guided, the cylinder being in operative contact with the contact carriers.

11. The arrangement according to claim 8, wherein the housing includes a hydraulic cylinder with a lid, the rod being designed as a piston rod, the rod being guided through the lid, the cylinder being in operative contact with the contact carriers.

12. The arrangement according to claim 10, wherein the lid is plastic and the contact carrier is formed in one piece with the lid.

13. The arrangement according to claim 2 further including a restraining device provided in the housing, the restraining device including a damped rotating part, which is connected to a pinion, and wherein the rod is movable in the housing and has a rack which mates with the pinion.

* * * * *